United States Patent
Gukal (10) Patent No.: US 10,296,662 B2
(45) Date of Patent: May 21, 2019

(54) STRATIFIED SAMPLING OF LOG RECORDS FOR APPROXIMATE FULL-TEXT SEARCH

(71) Applicant: CA, INC., New York, NY (US)

(72) Inventor: Sreenivas Gukal, Santa Clara, CA (US)

(73) Assignee: CA, INC., New York, NY (US)

( * ) Notice: Subject to any disclaimer, the term of this patent is extended or adjusted under 35 U.S.C. 154(b) by 1152 days.

(21) Appl. No.: 14/492,362

(22) Filed: Sep. 22, 2014

(65) Prior Publication Data

US 2016/0085790 A1    Mar. 24, 2016

(51) Int. Cl.
*G06F 17/30* (2006.01)
*G06F 7/00* (2006.01)
*G06F 17/40* (2006.01)
*G06F 11/30* (2006.01)
*G06F 16/31* (2019.01)

(52) U.S. Cl.
CPC .............. *G06F 17/40* (2013.01); *G06F 11/30* (2013.01); *G06F 16/31* (2019.01); *G06F 2201/81* (2013.01); *G06F 2201/815* (2013.01); *G06F 2201/88* (2013.01)

(58) Field of Classification Search
CPC ........... G06F 17/3053; G06F 17/30324; G06F 17/30648; H04L 65/40; G06Q 50/01
USPC ................................................. 707/748, 662
See application file for complete search history.

(56) References Cited

U.S. PATENT DOCUMENTS

| | | | |
|---|---|---|---|
| 6,704,698 B1 * | 3/2004 | Paulsen, Jr. | G06F 17/2715 704/1 |
| 9,235,846 B2 * | 1/2016 | Petschulat | G06F 17/30539 |
| 2011/0185234 A1 * | 7/2011 | Cohen | G06F 11/3476 714/37 |
| 2012/0124047 A1 * | 5/2012 | Hubbard | G06F 17/30637 707/737 |

* cited by examiner

*Primary Examiner* — Kuen S Lu
(74) *Attorney, Agent, or Firm* — Sage Patent Group (57) ABSTRACT

A log record from a host machine node includes an invariant string and a term. A template identifier is selected, from among template identifiers within a template repository, for a template string matching the invariant string. A sampling count threshold is selected from among a set of sampling count thresholds based on the template identifier and the term. A template-term count is obtained based on a number of earlier log records that were received since the count was reset and have a template identifier and a term that match the template identifier and the term of the log record. Based on the template-term count satisfying the sampling count threshold, an index entry is generated in a sampled log records index based on the log record and the template-term count is reset to a defined value. Based on the template-term count not satisfying the sampling count threshold, the template-term count is incremented.

20 Claims, 4 Drawing Sheets

STRATIFIED SAMPLING OF LOG RECORDS FOR APPROXIMATE FULL-TEXT SEARCH

TECHNICAL FIELD

The present disclosure relates to computer systems and more particularly to analysis of a stream of log records from computer equipment.

BACKGROUND

Data centers can contain thousands of servers (both physical and virtual machines), with each server running one or more software applications. The servers and software applications generate streams of log records to indicate their operational states and progression. For example, software applications may output log records that sequentially list actions that have been performed and/or list application state information at various checkpoints or when triggered by defined events (e.g., faults) occurrence, etc.

These log records are stored and searched by systems operators for various purposes—e.g., to detect anomalies, troubleshoot problems, mine information, check the health of the servers, etc.

In existing systems, the log records are stored in a log record repository, which may be a full-text index (FTI). An FTI allows complex text queries to be performed on the log records. The storage requirements of an FTI are proportional to the amount of content in each of the log records. The log records can be generated on the order of millions per second for large data centers. At these rates, storing the log records efficiently (both in terms of space and time), while also allowing for efficient searches, can be a significant challenge.

SUMMARY

Some embodiments disclosed herein are directed to a method by a computer. The method includes receiving a log record as part of a stream of log records from a host machine node. The log record includes an invariant string and a term. The method further includes selecting a template identifier, from among a plurality of template identifiers within a template repository, for a template string matching the invariant string of the log record. A sampling count threshold is selected from among a set of sampling count thresholds based on the template identifier and the term of the log record. A template-term count is obtained based on a number of earlier log records that were received since the count was reset and have a template identifier and a term that match the template identifier and the term of the log record. Based on the template-term count satisfying the sampling count threshold, an index entry is generated in a sampled log records index based on the log record and the template-term count is reset to a defined value. Based on the template-term count not satisfying the sampling count threshold, the template-term count is incremented.

Some other embodiments disclosed herein are directed to a computer program product that includes a computer readable storage medium having computer readable program code embodied therewith. The computer readable program code includes computer readable program code to receive a log record as part of a stream of log records from a host machine node, the log record comprising an invariant string and a term, to select a template identifier, from among a plurality of template identifiers within a template repository, for a template string matching the invariant string of the log record, and to select a sampling count threshold from among a set of sampling count thresholds based on the template identifier and the term of the log record. Further computer readable program code obtains a template-term count based on a number of earlier log records, which have been received since the count was reset, that have a template identifier and a term that match the template identifier and the term of the log record. Further computer readable program code is to, based on the template-term count satisfying the sampling count threshold, generate an index entry in a sampled log records index based on the log record and resetting the template-term count to a defined value. Further computer readable program code is to, based on the template-term count not satisfying the sampling count threshold, increment the template-term count.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
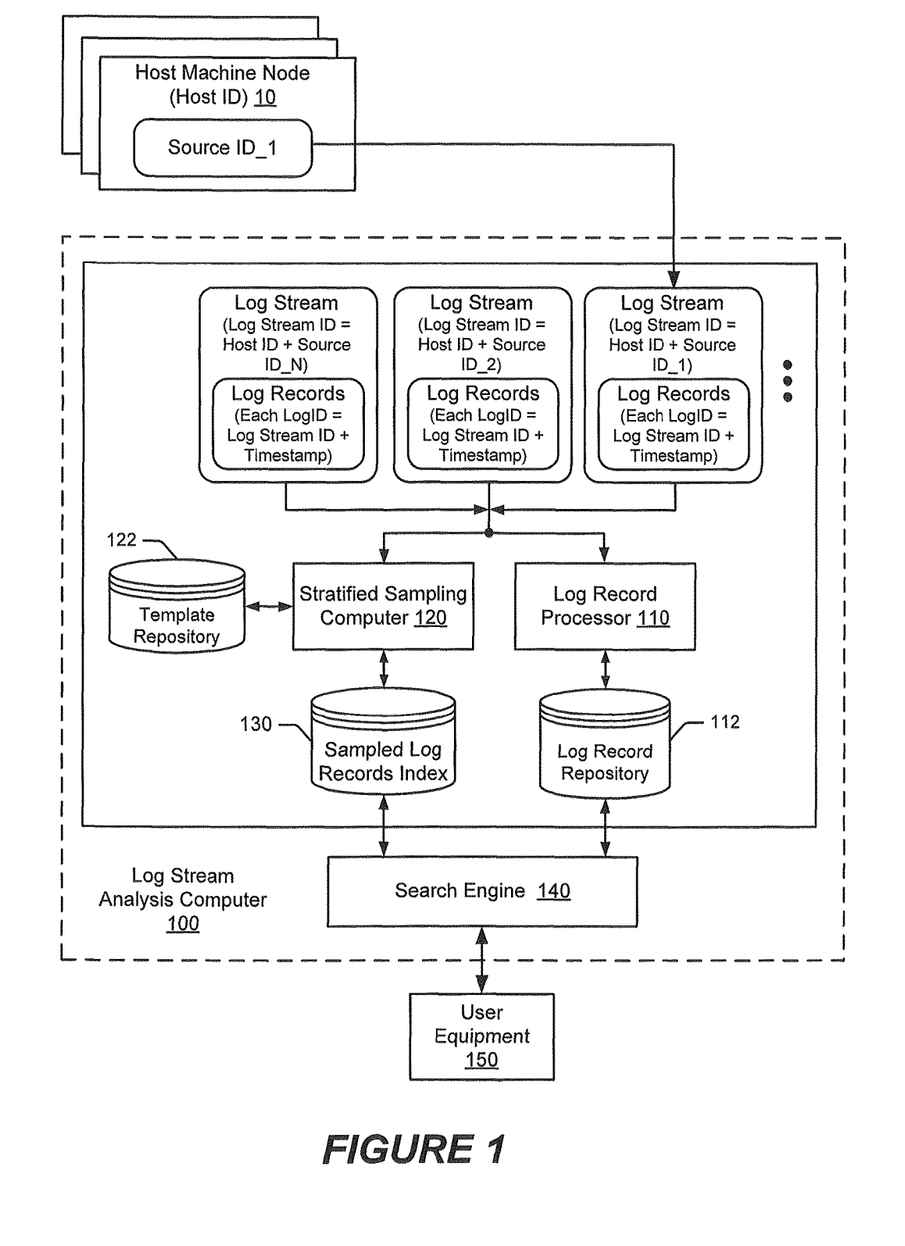
FIG. 1 is a block diagram of a system containing a log stream analysis computer which includes a stratified sampling computer that determines based on various template-term sampling count thresholds when log records of a stream are to be indexed in a sampled log records index, in accordance with some embodiments.

Some embodiments are disclosed herein in the context of the nonlimiting example block diagram of FIG. 1. A log stream analysis computer 100 receives log streams from one or more software sources executed by each of one or more host machine nodes 10. In the embodiment of FIG. 1, the log stream analysis computer 100 receives a log stream from Source ID_1 executed by the host machine node 10 identified by a Host ID, and can further receive log streams from other software sources executed by the same or other host machine nodes. A host machine node is also referred to as a "host node" and "host" for brevity.

A host machine node can include a physical host machine and/or a virtual machine (VM). The physical host machine includes circuitry that performs computer operations to execute one or more software sources. The physical host machine may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine may include computer resources such as: processor(s), such as a central processing unit (CPU); network interface(s); memory device(s); mass data storage device(s), such as disk drives, solid state nonvolatile memory, etc.; etc.

A physical host machine can provide one or more VMs that execute one or more software sources. A virtual hypervisor can provide an interface between the VMs and a host operating system that allows multiple guest operating systems and associated software sources to run concurrently on a physical host machine. The host operating system is responsible for the management and coordination of activities and the sharing of the computer resources of the physical host machine.

Each software source belongs to a source type. For example, a "SQL Server" may be a source type and each installation of SQL Server is a software source belonging to the source type. Multiple sources of the same or different source types may be on the same host, and a software source may migrate between hosts. Each host and software source is identified by a unique identifier, Host ID and Source ID respectively. A log stream (generated by a software source of a particular host) can be uniquely identified by a compound identifier generated from combination of the Host ID and Source ID, or in some embodiments may be uniquely identified by an identifier generated from the Source ID.

The log stream analysis computer 100 includes a log record processor 110 that partitions the received log stream into a sequence of log records according to a defined time interval (e.g., a defined number of seconds, minutes, or hours) or other defined event or rule. Each log record may be uniquely identified by an identifier (LogID) that is formed from a combination (e.g., concatenation) of the corresponding (Log Stream ID) from which the record was partitioned and a timestamp associated with the defined time interval or other defined event or rule. When a single block stream is received from a host machine node, the log record may be uniquely identified based on the timestamp alone. The interval size can be determined based on a trade-off analysis between storage space requirements and accuracy.

The log record processor 110 may store content of the log records in a log record repository 112. The log records may be indexed, such as by an inverted index, to facilitate searches among log records in the log record repository 112. As used herein, an index can provide a data structure which associates content of log records, such as strings of letters, words, and/or numbers, to their locations in the log records. The index allows running full-text queries on the log records. However, the storage needed for the index is a significant fraction of the input data size. The indexing time, storage and the search time are all proportional to the number of log records. In some distributed computing systems, such as large data centers, log records are generated on the order of millions per second. It can therefore be overly time-consuming and/or require excessive processing resources to conduct searches in the log record repository 112.

In accordance with at least some embodiments disclosed herein, a stratified sampling computer 120 operates to index log records only when various sampling count thresholds are satisfied which are defined based on content of the log record. Each log record includes an invariant string and a term. Different sampling count thresholds may be associated with different unique combinations of the invariant strings and the terms occurring in log records. For example, 100 percent sampling may be provided for log records containing one combination of invariant string and term which occur very infrequently, and 0.001 percent sampling may be provided for log records containing another combination of invariant string and term which occur much more frequently. The sampled log records can be indexed in a sampled log records index 130. Accordingly, log records containing frequently occurring combinations of invariant strings and terms can be rarely indexed in the sampled log records index 130 while log records containing another combination of invariant string and term can be always indexed, or a much greater percentage of their occurrence, in the sampled log records index 130. At least one log record for each occurrence of a combination of invariant string and term may be indexed in the sampled log records index 130.

The rate at which log records are indexed in the sampled log records index 130 can be controlled inversely proportional to how often particular combinations of invariant strings and terms occur in those log records. Controlling the indexing rate based on how often a particular combination of invariant string and term occurs in log records enables differentiated rates of indexing between one category of log records containing a term that occurs infrequently in combination with one defined invariant string, and another category of log records containing the term that occurs very frequently in combination with another defined invariant string. Indexing a higher percentage of log records containing combinations that occur infrequently may enable higher fidelity operational analysis of operational states captured in those log records. Indexing a much lower percentage of log records containing combinations that occur frequently reduces the associated content volume of the sampled log records index 130, and enables the content to be more rapidly searched (e.g., real-time searches) and used to generate log records.

The rate at which log records are indexed can be controlled based on knowledge of how frequently various combinations of invariant strings and terms in a stream of log records are desired to be included in the sample log records index 130 to enable, for example, analysis of those log records (e.g., root error cause analysis). Infrequent occurrences of a particular combination of invariant string and term can denote anomalies, errors, warnings, crashes, etc with operation of the host machine node and/or a source software application, and therefore, should be indexed more often when they do occur. The overhead for storing log records responsive to their containing an infrequently occurring combination of invariant string and term is accordingly reduced while the amount of information captured for subsequent high fidelity analysis of associated events is increased.

In one embodiment, the stratified sampling computer 120 receives a log record as part of a stream of log records from the host machine node 10. The log record includes an invariant string and a term. Some invariant strings contained in the log records correspond to template strings within a template repository 122. Unique ones of the invariant strings observed in the log records can be stored in the template repository 122 where they are logically associated with unique template identifiers.

Each template string can, for example, correspond to a "print" or other output routine in the software code of the source, outputs an invariant string (e.g., which does not vary between "prints" by the same print route) and a term (e.g., which can vary between "prints" by the same print routine) that is output in a same log record by the print statement whenever the print routine is executed. The invariant string may provide context for the term, such as a textual description that is intended for human understanding of the term, and which does not change between each repetition of the print routine or other output routine which generates the log record. Terms can include user names, IP addresses of the host machine nodes, event identifiers, values characterizing an application state (e.g., variable and/or register values) at an instant of time, processing error codes, etc, that can vary between each repetition of the print routine or other output routine which generates the log record.

Responsive to the invariant string in the received log record, the stratified sampling computer 120 selects a template identifier, from among the template identifiers within the template repository 122, for a template string matching the invariant string of the log record. The sampling computer 120 selects a sampling count threshold from among a set of sampling count thresholds based on the template identifier and the term of the log record. The sampling computer 120 obtains a template-term count based on a number of earlier log records, which have been received since the count was reset, that have a template identifier and a term that match the template identifier and the term of the log record. Based on the template-term count satisfying the sampling count threshold, the sampling computer 120 generates an index entry in the sampled log records index 130 based on the log record and resets the template-term count to a defined value. In contrast, based on the template-term count not satisfying the sampling count threshold, the sampling computer 120 increments the template-term count.

When generating the index entry in the sampled log records index 130, the sampling computer 120 may store the template identifier, the term, and an identifier for the log record in the sampled records index 130. The sampled log records index 130 can be significantly compressed in memory size by storing the template identifier instead of the invariant string. The sampled log records index 130 can be used to perform keyword searching of log records.

A search engine 140 is provided that allows a user, via user equipment 150 (e.g., desktop computer, laptop computer, tablet computer, smart phone, etc.), to perform searches of content of the log records. In accordance with some embodiments, the searches are performed using the sample log records index 130. The search engine 140 receives search query defining a search string and a time period to be searched, and determines a range of log records to be searched based on the time period. The search engine 140 selects a set of index entries in the sampled log records index 130 based on the range of log records, and retrieves the set of index entries from the sampled log records index 130. For each of the index entries in the set, the search engine 140 identifies a template identifier and a term of the index entry, retrieves the template string corresponding to the template identifier from the template repository 122, and generates a log record based on the template string retrieved and the term of the index entry. The search engine 140 then searches for the search string defined by the search query among the log records generated from the index entries in the set, and returns log records, identified by the search as containing the search string, as a response to the search query.

Figure 2:
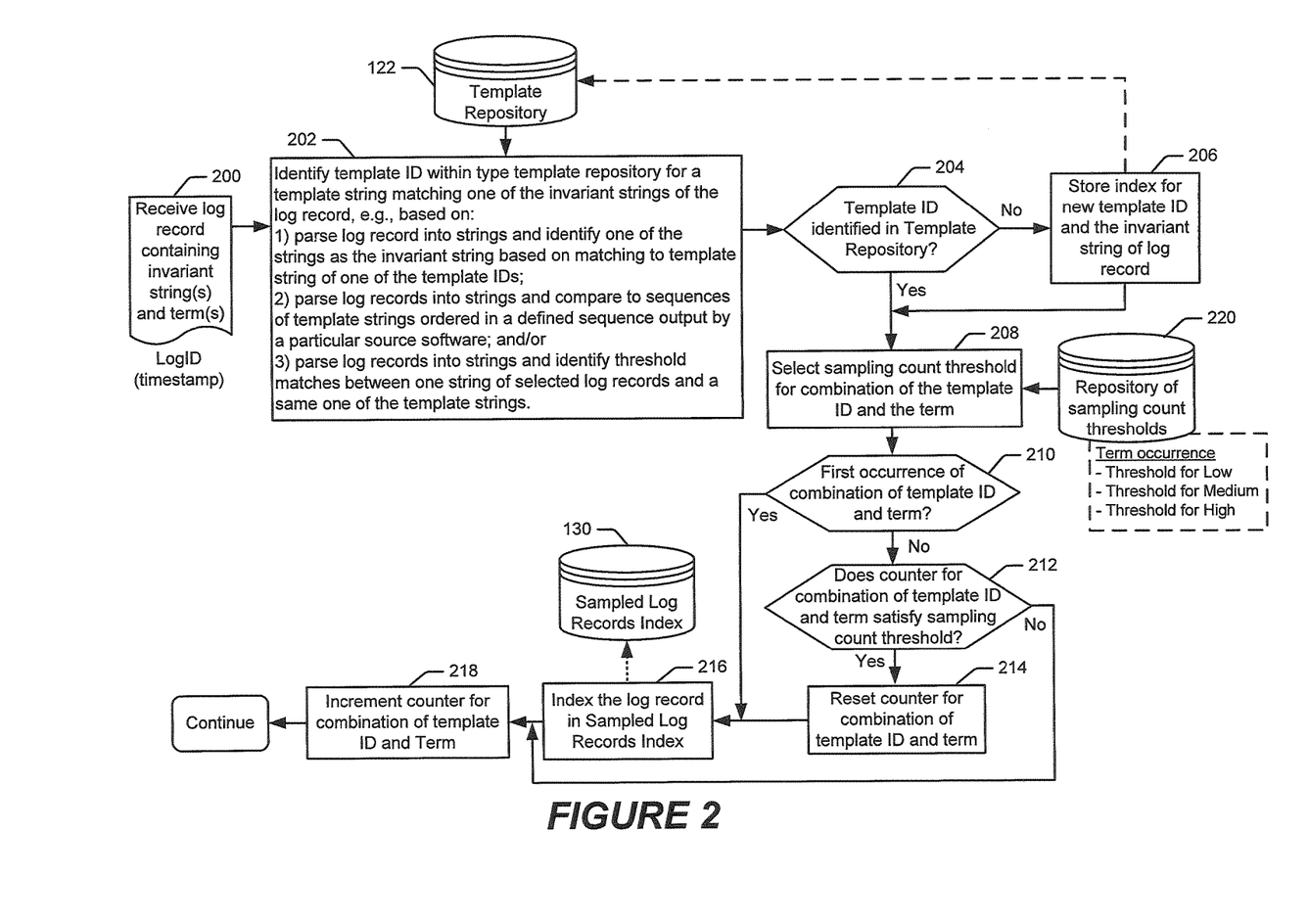
FIG. 2 is a flowchart of operations by the stratified sampling computer for determining based on various template-term sampling count thresholds when log records of a stream are to be indexed in a sampled log records index, in accordance with some embodiments.

FIG. 2 is a flowchart of operations by the stratified sampling computer 120 for determining based on various template-term sampling count thresholds when log records of a stream are to be indexed in the sampled log records index 130, in accordance with some embodiments.

Referring to FIG. 2, the stratified sampling computer 120 receives (block 200) a log record that contains an invariant string and a term. The log record may include a plurality of invariant strings and/or a plurality of terms. The log record may be identified by a log ID which is unique across all of the log records. The log ID can be generated based on a timestamp for when the log record was generated. The timestamp is translated into some time unit (based on the log record generation rate) since a fixed point in time (called epoch). For example, suppose the time unit is seconds, the epoch is (Jan. 1, 2001 00:00:00 AM) and the log record was generated on Jun. 1, 2015 at 10:45:15 AM. The logID will be the difference between the timestamp and the epoch, converted into seconds.

The stratified sampling computer 120 identifies (block 202) a template identifier within the template repository 122 for a template string matching the invariant string of the log record.

In one embodiment, the template identifier is identified based on a predefined rule that identifies the structure of invariant string(s) and term(s) that are output by print routines or other output routines of a software source which is the source of the log stream. When this structure is not predefined by a rule, the template identifier can be inferred using one of the following embodiments.

In one embodiment, the template identifier is identified based on parsing content of the log record to generate strings, comparing the strings to template strings within the template repository 122, identifying one of the strings of the log record as the invariant string based on a match between the one of the strings and one of the template strings, and selecting the template identifier associated with the one of the template strings.

In another embodiment, the template identifier is identified based on parsing content of a plurality of log records that includes the log record to generate strings, comparing the strings to template strings within the template repository 122, identifying one of the strings of selected ones of the log records as the invariant string based on at least a threshold number of matches occurring between the one of the strings of the selected ones of the log records to a same one of the template strings within the template repository 122, and selecting the template identifier associated with the one of the template strings.

In another embodiment, the template identifier is identified based on parsing content of a sequence of the log records that includes the log record to generate strings, comparing the strings to template strings within the template repository 122 that are ordered in a defined sequence that is output by a defined software source on the host machine node 10, identifying one of the strings as the invariant string based on a match between the one of the strings and one of the template strings and further based on a previous match identified between one of the strings of a previous one of the log records in the sequence and a previous one of the template strings in the defined sequence, and selecting the template identifier associated with the one of the template strings.

When the stratified sampling computer 120 identifies (block 204) that no template string in the template repository 122 matches the invariant string of the log record, a new template identifier for the invariant string of the log record is generated. The new template identifier and the invariant string of the log record are then stored (block 206) in the template repository 122 with a defined logical association between the new template identifier and the invariant string of the log record.

The stratified sampling computer 120 selects (block 208) a sampling count threshold from among a set of sampling count thresholds based on the template identifier and the term of the log record. The sampling count threshold can be unique to a particular combination of template identifier and term or can be used for a plurality of defined combinations of template identifiers in terms.

The set of sampling count thresholds may reside in a repository 220. In one embodiment, a first sampling count threshold is defined for one or more combinations of template identifiers and terms that occur infrequently (e.g., occurring below a first threshold rate), and second sampling count threshold is defined for another one or more combinations of template identifiers and terms that occur more frequently (e.g., occur above the first threshold rate and below a second threshold rate), a third sampling count threshold is defined for still one or more other combinations of template identifiers and terms that occur even more frequently (e.g., occur above the second threshold rate), etc.

A sampling count threshold may be generated based on how frequently a particular combination of template identifier and term has occurred historically in a stream of log records. In one embodiment, for a combination of a template identifier and a term occurring in earlier log records received from the host machine node, the stratified sampling computer 120 counts a number of occurrences of the combination of the template identifier and the term in the earlier log records to generate a historical count, generates a new sampling count threshold for the combination of the template identifier and the term based on the historical count, and stores the new sampling count threshold in the set of sampling count thresholds (e.g., within the repository 220) with a logical association to the template identifier and the term.

In one approach when generating the new sampling count threshold for the combination of the template identifier and the term based on the historical count, the new sampling count threshold can be decreased based on less frequent occurrence of the combination of template identifier and term indicated by the historical count. In contrast, the new sampling count threshold can be increased based on more frequent occurrence of the combination of template identifier and term indicated by the historical count.

In another approach when generating the new sampling count threshold for the combination of the template identifier and the term based on the historical count, a first value is defined for the new sampling count threshold based on the historical count being less than a first threshold level defined based on a predicted frequency of problematic operation of the host machine node being reported in log reports. In contrast, a second value, which is greater than the first value, is defined for the new sampling count threshold based on the historical count being greater than a second threshold level that is greater than the first threshold level defined based on a predicted frequency of non-problematic operation of the host machine node being reported in log reports.

Sampling count thresholds may alternatively or additionally be generated dynamically based on observations made on the content of a stream of received log records. For example, for each of a plurality of combinations of template identifiers and terms occurring in log records received as part of the log stream, the stratified sampling computer 120 can count a number of occurrences of the combination of template identifier and term in the log records to generate a historical count, and generate a new sampling count threshold for the combination of template identifier and term based on the historical count. The new sampling count threshold is stored in the set of sampling count thresholds (e.g. the repository 220) with a logical association to the combination of template identifier and term. Thus, as new template strings and/or terms are observed as content within the stream of log records the stratified sampling computer 120 can operate to generate new sampling count thresholds for each of those combinations. When generating new sampling count thresholds the computer 120 may generate a unique sampling count threshold for each combination or may associate a plurality of observed combinations having similar frequency of occurrences to a same group having a same sampling count threshold. Thus, some combinations of template identifiers and terms that occur within a first range of rates can be associated with a first sampling count threshold, while some other combinations of template identifiers and terms that occur within a second range of rates can be a associated with a second sampling count threshold, and so on.

A sampling count threshold may alternatively or additionally be generated based on a percentage value that is received via a user interface from user. The percentage value identifies a percentage of occurrences of the combination of template identifier and term in a log record that are to be indexed in the sampled log records index 130.

With continued reference to FIG. 2, the stratified sampling computer 120 determines whether it is observing a first occurrence of a combination of template identifier and term and, if so, the log record is indexed (block 216) in the sampled log records index 130. The indexing of log records in the sampled log records index 130 may form an inverted index structure that logically associates the template identifier, the term, and an identifier for the log record. Accordingly, at least one log record containing each unique combination of template identifier and term is indexed in the sampled log records index 130. The sampled log records index 130 may require many orders of magnitude less storage space than would be required by a full index of all log records in the log record repository 112. A template-term counter for the combination of template identifier and term is incremented (block 218).

When the combination of template identifier and term is determined (block 210) to have occurred before, the stratified sampling computer 120 further determines (block 212) whether a template-term counter for the combination of template identifier and term satisfies the sampling count threshold that was selected (block 208). The template-term counter can operate to uniquely track the number of occurrences of the particular combination of template identifier and term, which are presently observed in the log record, that have occurred in earlier log records which have been received since the counter was last reset. Accordingly, the stratified sampling computer 120 may maintain a table of template-term counter values each associated with a different combination of template identifier and term. A template-term count can be selected from among the plurality of template-term counts, which are each associated with a different combination of template identifier and term, based on the template identifier and the term from the log record.

When the template-term counter satisfies the sampling count threshold, the template-term counter is reset (block 214) to a defined value (e.g., reset to 0), and the log record is indexed (block 216) in the sampled log records index 130.

Accordingly, samples of a stream of log records are selected for indexing to the sampled log records index 130 each time another threshold number of a defined combination of template identifier and term are observed in log records.

For example, when the sampling count threshold is defined to cause 0.0001% of a defined combination of template identifier and term to be indexed in the sampled log records index 130, each one millionth occurrence of a log record containing that defined combination of template identifier and term is indexed in the sampled log records index 130. The sampled log record is not selected merely because it is the one millionth occurrence of a log record in the stream, but instead because within the perhaps 100's of million log records that have been received in the stream it is the one millionth occurrence of a log record in the stream containing the defined combination of template identifier and term. Further to this example, for another combination of template identifier and term that occurs much less frequently and which may be known to be associated with erroneous operation of the host machine node 10, each tenth occurrence of a log record containing that other combination of template identifier and term is indexed in the sampled log records index 130.

The template-term counter for the combination of template identifier and term is then incremented (block 218).

Searching Log Records Using the Sampled Log Records Index

Figure 3:
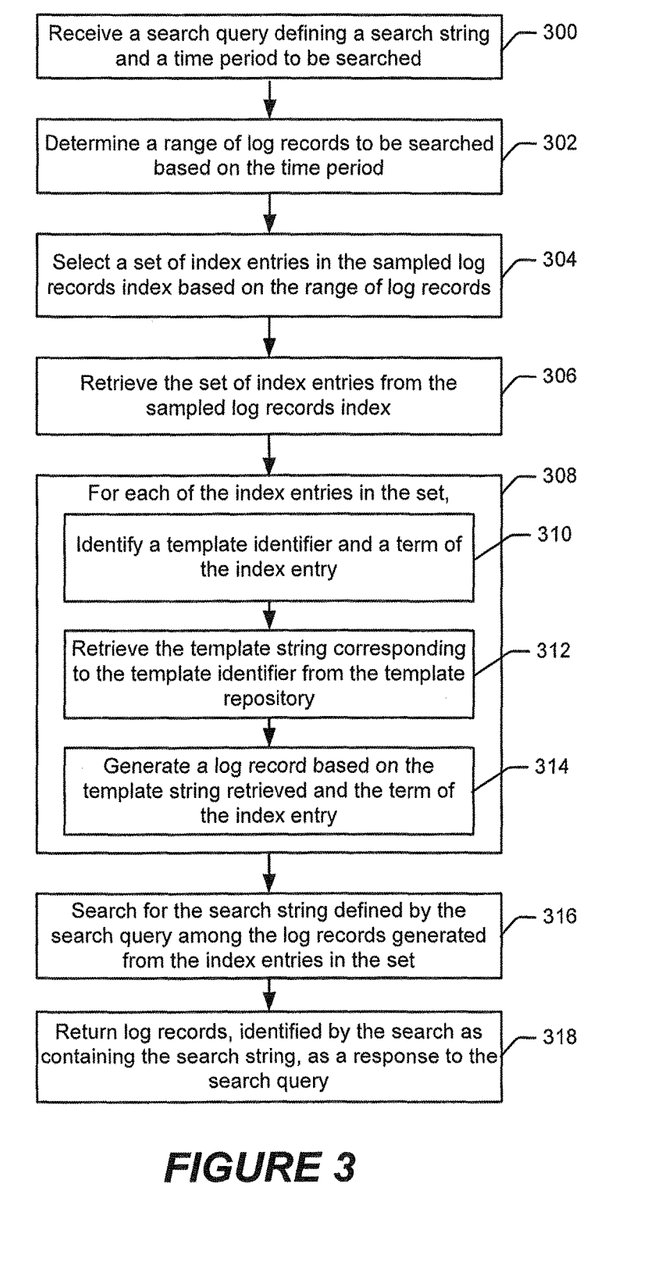
FIG. 3 is a flowchart of operations by a search engine for searching a sampled log records index, based on a search term and time period defined by a received search query, to retrieve template strings and terms which are used to generate log records, and identifying which of those log records satisfy the search term, in accordance with some embodiments.

FIG. 3 is a flowchart of operations that may be performed by the search engine 140 for searching the sampled log records index 130, based on a search term and time period defined by a received search query, to retrieve template strings and terms which are used to generate log records, and to identify which of those log records satisfy the search term, in accordance with some embodiments. Referring to FIGS. 1 and 3, a search query is received (block 300) that defines a search string and a time period to be searched. A range of log records to be searched is determined (block 302) based on the time period. A set of index entries in the sampled log records index 130 is selected (block 304) based on the range of log records. The set of index entries is retrieved (block 306) from the sampled log records index 130. For each of the index entries in the set operations (block 308) repeat to identify (block 310) a template identifier and a term of the index entry, retrieve (block 312) the template string corresponding to the template identifier from the template repository 122, and generate (block 314) a log record based on the template string retrieved and the term of the index entry. Searches (block 316) are performed among the log records generated from the index entries in the set to identify the search string defined by the search query. Log records which were identified by the search as containing the search string, are returned (block 318) as a response to the search query.

When returning (block 318) the log records, each invariant string and term may be tagged with an indication of the frequency with which it occurred. A user can determine characteristics of the returned results by observing the frequency of the invariant strings and/or terms. A user may use the returned results to generate another search query have different search terms and/or logical combinations thereof based on what the user learned from the returned results. The new search query may be run again all log records stored in the log record repository 112 to obtain a complete listing of log records that were received in the stream which satisfy conditions of the new search query. It is noted that searches performed using the sampled log records index 130 return less log records than a search on the log record repository 112 or a full index of all log records in the log record repository 112, but may be performed using far less computational and storage resources and/or much faster.

Example Log Stream Analysis Computer

Figure 4:
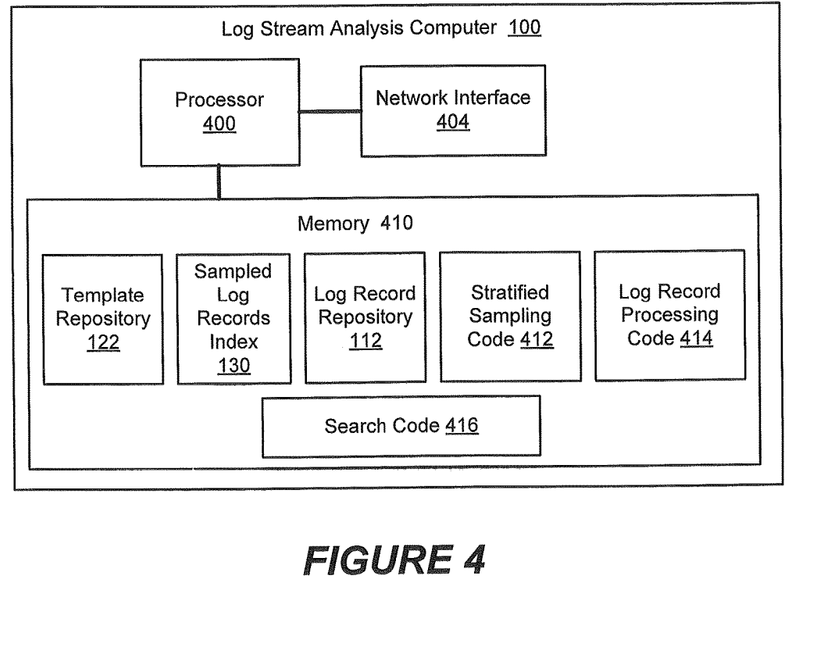
FIG. 4 is a block diagram of a log stream analysis computer configured according to some embodiments.

FIG. 4 is a block diagram of the log stream analysis computer 100 or a component thereof in FIG. 1 configured according to one embodiment. Referring to FIG. 4, a processor 400 may include one or more data processing circuits, such as a general purpose and/or special purpose processor (e.g., microprocessor and/or digital signal processor) that may be collocated or distributed across one or more networks. The processor 400 is configured to execute computer readable program code in a memory 410, described below as a computer readable medium, to perform some or all of the operations and methods disclosed herein for one or more of the embodiments. The program code can include stratified sampling code 412 configured, log record processing code 414, search code 416, the template repository 122, the sampled log records index 130, and/or the log record repository 112. The stratified sampling code 412 can be computer readable program code to perform at least some of the operations disclosed herein for the stratified sampling computer 120 and associated operations of FIG. 2. The log record processing code 414 can be computer readable program code to perform to perform at least some of the operations disclosed herein regarding processing of a stream of log records by the log record processor 110. The search code 416 can be computer readable program code to perform to perform at least some of the operations disclosed herein regarding searching for log records, such as the operations of FIG. 3. Although a single memory block 410 has been illustrated for simplicity, it is to be understood that any number, combination of types, and hierarchy of memory storage devices (e.g, solid state memory devices, local disk drives, networked disk drives, etc.) can be used. A network interface 404 can communicatively connect the processor 400 to the host machine nodes 10, the search engine 140, and the user equipment 150 shown in FIG. 1.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method performed by a stratified sampling computer configured to index log records of a computing network in a datacenter, the method comprising:
    receiving a log record as part of a stream of log records from a host machine node of the computing network, the log record comprising an invariant string identifying a problematic operation of the host machine node and a variant term;
    selecting a template identifier, from among a plurality of template identifiers within a template repository, for a template string matching the invariant string of the log record;
    selecting a sampling count threshold from among a set of sampling count thresholds based on a combination of the template identifier and the term of the log record, the sampling count threshold defining a number of occurrences of the combination of the template identifier and the term of the log record required to generate an index entry in a sampled log records index for the log record;
    determining whether a number of occurrences of the combination of the template identifier and the variant term satisfy the selected sampling count threshold;
    responsive to determining the number of occurrences of the combination of the template identifier and the variant term satisfy the selected sampling count threshold, generating an index entry in the sampled log records index based on the log record, the index entry excluding the invariant string and comprising the template identifier, the variant term, and an identifier for the log record;
    responsive to determining the number of occurrences of the combination of the template identifier and the variant term do not satisfy the selected sampling count threshold, preventing generation of the index entry in the sample log records index;
    responsive to receiving a search query containing a search string from a user equipment operating in the computer network, retrieving a set of index entries from the sampled log records index;
    for each of the index entries in the set,
        identifying a template identifier and a variant term of the index entry,
        retrieving the template string corresponding to the template identifier from the template repository, and generating a log record based on the template string retrieved and the variant term of the index entry;
    searching for the search string comprised in the search query from among the log records generated from the index entries in the set; and
    returning, to the user equipment, the log records generated from the index entries in the set, identified by the search as containing the search string, as a response to the search query.

2. The method of claim 1, further comprising:
    obtaining a template-term count based on a number of earlier log records that were received since the count was reset and have a template identifier and a variant term that match the template identifier and the term of the log record;
    based on the template-term count not satisfying the sampling count threshold, incrementing the template-term count; and
    wherein generating the index entry in a sampled log records index based on the log record further comprises generating the index entry in the sampled log records index based on the template-term count satisfying the sampling count threshold.

3. The method of claim 2, wherein the obtaining a template-term count based on a number of earlier log records that were received since the count was reset and have a template identifier and a term that match the template identifier and the term of the log record, comprises:
    selecting the template-term count from among a plurality of template-term counts each associated with a different combination of template identifier and term, based on the template identifier and the variant term of the log record.

4. The method of claim 2, further comprising:
    for a combination of a template identifier and a variant term occurring in earlier log records received from the host machine node, counting a number of occurrences of the combination of the template identifier and the variant term in the earlier log records to generate a historical count;
    generating a new sampling count threshold for the combination of the template identifier and the variant term based on the historical count; and
    storing the new sampling count threshold in the set of sampling count thresholds with a logical association to the template identifier and the variant term.

5. The method of claim 4, wherein the generating a new sampling count threshold for the combination of the template identifier and the variant term based on the historical count, comprises:
    decreasing the new sampling count threshold based on less frequent occurrence of the combination of the template identifier and the variant term indicated by the historical count; and
    increasing the new sampling count threshold based on more frequent occurrence of the combination of the template identifier and the variant term indicated by the historical count.

6. The method of claim 4, wherein the generating a new sampling count threshold for the combination of the template identifier and the variant term based on the historical count, comprises:
    defining a first value for the new sampling count threshold based on the historical count being less than a first threshold level defined based on a predicted frequency of problematic operation of the host machine node being reported in log reports; and
    defining a second value, which is greater than the first value, for the new sampling count threshold based on the historical count being greater than a second threshold level that is greater than the first threshold level defined based on a predicted frequency of non-problematic operation of the host machine node being reported in log reports.

7. The method of claim 2, further comprising:
for each of a plurality of combinations of template identifiers and variant terms occurring in log records received as part of the log stream,
  counting a number of occurrences of the combination of template identifier and variant term in the log records to generate a historical count,
  generating a new sampling count threshold for the combination of template identifier and variant term based on the historical count, and
  storing the new sampling count threshold in the set of sampling count thresholds with a logical association to the combination of template identifier and variant term.

8. The method of claim 2, further comprising:
generating a new sampling count threshold based on a percentage value received via a user interface from a user for a percentage of occurrences of a combination of template identifier and variant term in a log record that are to be indexed in the sampled log records index; and
storing the new sampling count threshold in the set of sampling count thresholds with a logical association to the combination of template identifier and variant term.

9. The method of claim 1, wherein
receiving the search query defining a search string comprises receiving a time period to be searched; the method further comprising:
determining a range of log records to be searched based on the time period;
selecting the set of index entries in the sampled log records index based on the range of log records.

10. The method of claim 1, wherein the selecting the template identifier, from among the plurality of template identifiers within the template repository, for the template string matching the invariant string of the log record, comprises:
  parsing content of the log record to generate strings;
  comparing the strings to template strings within the template repository;
  identifying one of the strings of the log record as the invariant string based on a match between the one of the strings and one of the template strings; and
  selecting the template identifier associated with the one of the template strings.

11. The method of claim 1, wherein the selecting the template identifier, from among the plurality of template identifiers within the template repository, for the template string matching the invariant string of the log record, comprises:
  parsing content of a plurality of log records that includes the log record to generate strings;
  comparing the strings to template strings within the template repository;
  identifying one of the strings of selected ones of the log records as the invariant string based on at least a threshold number of matches occurring between the one of the strings of the selected ones of the log records to a same one of the template strings within the template repository; and
  selecting the template identifier associated with the one of the template strings.

12. The method of claim 1, wherein the selecting the template identifier, from among the plurality of template identifiers within the template repository, for the template string matching the invariant string of the log record, comprises:
  parsing content of a sequence of the log records that includes the log record to generate strings;
  comparing the strings to template strings within the template repository that are ordered in a defined sequence that is output by a defined software source on the host machine node;
  identifying one of the strings as the invariant string based on a match between the one of the strings and one of the template strings and further based on a previous match identified between one of the strings of a previous one of the log records in the sequence and a previous one of the template strings in the defined sequence; and
  selecting the template identifier associated with the one of the template strings.

13. A computer program product comprising:
a computer readable non-transitory storage medium of a stratified sampling computer having computer readable program code embodied therewith, the computer readable program code comprising:
  computer readable program code to receive a log record as part of a stream of log records from a host machine node of the computing network, the log record comprising an invariant string identifying a problematic operation of the host machine node and a variant term;
  computer readable program code to select a template identifier, from among a plurality of template identifiers within a template repository, for a template string matching the invariant string of the log record;
  computer readable program code to select a sampling count threshold from among a set of sampling count thresholds based on a combination of the template identifier and the term of the log record, the sampling count threshold defining a number of occurrences of the combination of the template identifier and the term of the log record required to generate an index entry in a sampled log records index for the log record;
  computer readable program code to determine whether a number of occurrences of the combination of the template identifier and the variant term satisfy the selected sampling count threshold;
  computer readable program code to generate an index entry in the sampled log records index based on the log record, the index entry excluding the invariant string and comprising the template identifier, the variant term, and an identifier for the log record in response to determining the number of occurrences of the combination of the template identifier and the variant term satisfy the selected sampling count threshold;
  computer readable program code to prevent generation of the index entry in the sample log records index in response to determining the number of occurrences of the combination of the template identifier and the variant term do not satisfy the selected sampling count threshold;
  computer readable program code to retrieve a set of index entries from the sampled log records index in response to receiving a search query containing a search string from a user equipment operating in the computer network;
  computer readable program code to, for each of the index entries in the set:

identify a template identifier and a variant term of the index entry, retrieve the template string corresponding to the template identifier from the template repository, and generate a log record based on the template string retrieved and the term of the index entry;

computer readable program code to search for the search string comprised in the search query from among the log records generated from the index entries in the set; and computer readable program code to return log records, identified by the search as containing the search string, as a response to the search query.

14. The computer program product of claim 13, further comprising:

computer readable program code to obtain a template-term count based on a number of earlier log records that were received since the count was reset and have a template identifier and a term that match the template identifier and the term of the log record;

computer readable program code to, based on the template-term count not satisfying the sampling count threshold, increment the template-term count; and wherein the computer readable program code to generate the index entry in the sampled log records index based on the log record further comprises computer readable program code to generate the index entry and reset the template term count to a defined value based on the template-term count satisfying the sampling count threshold.

15. The computer program product of claim 14, wherein the computer readable program code to retrieve a set of index entries from the sampled log records index further comprises:

computer readable program code to receive the search query defining the search string and a time period to be searched;

computer readable program code to determine a range of log records to be searched based on the time period;

computer readable program code to select the set of index entries in the sampled log records index based on the range of log records.

16. The computer program product of claim 14, wherein the computer readable program code to obtain a template-term count based on a number of earlier log records that were received since the count was reset and have a template identifier and a variant term that match the template identifier and the term of the log record, comprises:

computer readable program code to select the template-term count from among a plurality of template-term counts each associated with a different combination of template identifier and variant term, based on the template identifier and the variant term of the log record.

17. The computer program product of claim 14, further comprising:

computer readable program code to, for a combination of a template identifier and a variant term occurring in earlier log records received from the host machine node, count a number of occurrences of the combination of the template identifier and the variant term in the earlier log records to generate a historical count;

computer readable program code to generate a new sampling count threshold for the combination of the template identifier and the variant term based on the historical count; and computer readable program code to store the new sampling count threshold in the set of sampling count thresholds with a logical association to the template identifier and the variant term.

18. The computer program product of claim 17, wherein the computer readable program code to generate a new sampling count threshold for the combination of the template identifier and the variant term based on the historical count, comprises:

computer readable program code to define a first value for the new sampling count threshold based on the historical count being less than a first threshold level defined based on a predicted frequency of problematic operation of the host machine node being reported in log reports; and computer readable program code to define a second value, which is greater than the first value, for the new sampling count threshold based on the historical count being greater than a second threshold level that is greater than the first threshold level defined based on a predicted frequency of non-problematic operation of the host machine node being reported in log reports.

19. The computer program product of claim 14, further comprising:

computer readable program code to, for each of a plurality of combinations of template identifiers and variant terms occurring in log records received as part of the log stream, count a number of occurrences of the combination of template identifier and variant term in the log records to generate a historical count, generate a new sampling count threshold for the combination of template identifier and variant term based on the historical count, and store the new sampling count threshold in the set of sampling count thresholds with a logical association to the combination of template identifier and variant term.

20. The computer program product of claim 13, wherein the computer readable program code to select the template identifier, from among the plurality of template identifiers within the template repository, for the template string matching the invariant string of the log record, comprises:

computer readable program code to parse content of a plurality of log records that includes the log record to generate strings;

computer readable program code to compare the strings to template strings within the template repository;

computer readable program code to identify one of the strings of selected ones of the log records as the invariant string based on at least a threshold number of matches occurring between the one of the strings of the selected ones of the log records to a same one of the template strings within the template repository; and computer readable program code to select the template identifier associated with the one of the template strings.

* * * * *